United States Patent
Diehl et al.

(10) Patent No.: US 12,024,151 B2
(45) Date of Patent: Jul. 2, 2024

(54) METHOD FOR CONTROLLING A BRAKE SYSTEM OF A VEHICLE

(71) Applicant: Continental Teves AG & Co. oHG, Frankfurt (DE)

(72) Inventors: Marius Diehl, Weilmünster (DE); Joachim Borneis, Niederaula (DE); Jan Falkner, Bad Vilbel (DE); Arne Cornils, Groß Rohrheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 335 days.

(21) Appl. No.: 17/117,349

(22) Filed: Dec. 10, 2020

(65) Prior Publication Data

US 2021/0179045 A1 Jun. 17, 2021

(30) Foreign Application Priority Data

Dec. 11, 2019 (DE) ...................... 10 2019 219 328.5

(51) Int. Cl.
| | |
|---|---|
| *B60T 7/12* | (2006.01) |
| *B60Q 5/00* | (2006.01) |
| *B60Q 9/00* | (2006.01) |
| *B60T 8/17* | (2006.01) |
| *B60T 8/32* | (2006.01) |

(Continued)

(52) U.S. Cl.
CPC ................ B60T 8/96 (2013.01); *B60Q 5/005* (2013.01); *B60Q 9/00* (2013.01); *B60T 8/17* (2013.01);

(Continued)

(58) Field of Classification Search
CPC ... B60T 8/96; B60T 8/17; B60T 8/321; B60T 17/221; B60T 2220/00; B60T 2240/00;

(Continued)

(56) References Cited

U.S. PATENT DOCUMENTS

| | | | | |
|---|---|---|---|---|
| 6,092,879 A | * | 7/2000 | Kornhaas | ................ B60T 8/885 |
| | | | | 303/122.04 |
| 9,545,906 B2 | * | 1/2017 | Zimmermann | ........... B60T 7/22 |

(Continued)

FOREIGN PATENT DOCUMENTS

| | | |
|---|---|---|
| DE | 19511161 A1 | 10/1996 |
| DE | 102007046692 A1 | 4/2009 |

(Continued)

OTHER PUBLICATIONS

European Search Report dated May 3, 2021, in counterpart European Patent Application No. 202003743.8.

(Continued)

*Primary Examiner* — Shardul D Patel

(57) ABSTRACT

A method for controlling a brake system of a vehicle comprises detecting a failure of a sensor for at least one of the vehicle wheels, checking whether a brake control function is being executed at the time of the failure, continuing the brake control function if a brake control function is being executed and deactivating the brake control function when execution of the brake control function has been completed. If no brake control function is being executed at the time of the failure then executing the brake control function if a brake control function is initiated within a defined period of time after the failure, and deactivating the brake control function after execution of the brake control function has been completed and the period of time has expired or if no brake control function has been initiated within the defined period of time.

8 Claims, 2 Drawing Sheets

(51) Int. Cl.
*B60T 8/96* (2006.01)
*B60T 17/22* (2006.01)

(52) U.S. Cl.
CPC ............ *B60T 8/321* (2013.01); *B60T 17/221* (2013.01); *B60T 2220/00* (2013.01); *B60T 2240/00* (2013.01); *B60T 2250/03* (2013.01); *B60T 2270/10* (2013.01); *B60T 2270/416* (2013.01)

(58) Field of Classification Search
CPC ............ B60T 2250/03; B60T 2270/10; B60T 2270/416; B60T 2201/024; B60T 2270/402; B60T 8/885; B60T 7/12; B60Q 5/005; B60Q 9/00
USPC .......................................................... 701/76
See application file for complete search history.

(56) References Cited

U.S. PATENT DOCUMENTS

| 2007/0050107 A1* | 3/2007 | Tanaka | B60C 23/0408 |
| | | | 701/42 |
| 2007/0233357 A1* | 10/2007 | Sugai | B60L 15/2054 |
| | | | 701/105 |
| 2010/0013296 A1* | 1/2010 | Raby | B64C 25/46 |
| | | | 303/126 |
| 2011/0264348 A1* | 10/2011 | Cetinkaya | B60T 7/22 |
| | | | 701/70 |
| 2015/0134217 A1* | 5/2015 | Drewes | B60T 8/172 |
| | | | 701/70 |
| 2016/0272180 A1* | 9/2016 | Morimura | B60T 8/885 |
| 2019/0118786 A1* | 4/2019 | Wulf | B60T 13/662 |
| 2021/0070268 A1* | 3/2021 | Passmann | B60T 13/662 |

FOREIGN PATENT DOCUMENTS

| DE | 102014209162 A1 * | 11/2015 | ............ B60T 7/22 |
| DE | 102014209162 A1 | 11/2015 | |
| DE | 102017012110 A1 | 7/2019 | |
| DE | 102017012130 A1 | 7/2019 | |

OTHER PUBLICATIONS

Search Report dated Oct. 15, 2020 from corresponding German Patent Application No. 10 2019 219 328.5.

* cited by examiner

METHOD FOR CONTROLLING A BRAKE SYSTEM OF A VEHICLE

CROSS-REFERENCE TO RELATED APPLICATIONS

This U.S. patent application claims the benefit of German patent application No. 10 2019 219 328.5 filed Dec. 11, 2019, which is hereby incorporated by reference.

TECHNICAL FIELD

The invention relates to a method for controlling a brake system of a vehicle.

BACKGROUND

In modern vehicles, vehicle drivers are assisted by a large number of driving assistance functions in driving the vehicle. Known examples of such driving assistance functions are antilock systems or stability programs, which regulate a deceleration or acceleration behavior of the vehicle demanded by the vehicle driver in such a way that the driving stability of the vehicle is ensured at all times.

Many of these driving assistance functions, especially functions which relate to control of braking behavior of the vehicle (brake control functions), are based on monitoring the rotational speeds of the vehicle wheels (wheel speeds). Thus, in the case of antilock systems, for example, the braking force is usually reduced at one vehicle wheel as soon as the monitored wheel speeds indicate that the vehicle wheel is exhibiting excessive slip.

In the event of a failure of one or more wheel speed sensors, provision is usually made to deactivate such brake control functions since reliable control is possible to only a limited extent, or not at all, in the absence of the corresponding wheel speed information.

Moreover, if a brake control function is being executed at the time of the failure, provision is often made to immediately exclude the wheel affected by the failure from the brake control function. In this case, it is possible either to transmit a braking demand to the affected wheel in an unregulated manner or for the affected wheel no longer to be activated to decelerate the vehicle. In the first case, locking up of the affected wheel can no longer be prevented effectively, while, in the second case, the available deceleration power is significantly reduced.

The procedure described above may be problematic, especially if the failure of a wheel speed sensor is attributable to a vehicle accident. In this case, safety routines which are based on brake control functions of this kind and which are supposed to implement automatic braking after the accident (post crash braking), for example, would no longer be available.

Therefore, it is desirable to provide a method for controlling a brake system of a vehicle which overcomes the disadvantages described above and improves the availability and effectiveness of brake control functions in the event of a failure of corresponding sensor means for determining wheel speeds.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for controlling a brake system of a vehicle comprises at least one wheel brake per vehicle wheel. Wheel speeds of the vehicle wheels are determined with a sensor device provided for each of the at least one wheel brakes, wherein the brake system is designed to execute brake control functions on the basis of the wheel speeds determined by the sensor device. The system detects a failure of the sensor device for at least one of the vehicle wheels, checks whether a brake control function is being executed by the brake system at the time of the failure, continues the brake control function if a brake control function is being executed by the brake system at the time of the failure and deactivates the brake control function when the execution of the brake control function has been completed.

If no brake control function is being executed by the brake system at the time of the failure the system checks whether a brake control function is initiated within a defined period of time after the time of the failure. The system then executes the brake control function if a brake control function is initiated within the defined period of time after the time of the failure and deactivates the brake control function when one of the execution of the brake control function has been completed and the period of time has expired and if no brake control function has been initiated within the defined period of time after the time of the failure.

In this context, a "brake control function" may be interpreted to mean a function which exercises open-loop or closed-loop control over a torque produced by the wheel brakes of the vehicle as a result of a braking demand in any form. In this case, the corresponding braking demand can be initiated either by a vehicle driver or by a (partially) autonomous driving function, e.g. an autopilot or emergency braking assistant. For example, the brake control function can be a function which brings the vehicle to a halt automatically and preferably with the maximum possible deceleration after the detection of a vehicle accident. In this case, such a function can also access other brake control functions, which are intended to ensure a maximum deceleration while maintaining the same controllability of the vehicle, for example.

Here, the "deactivation" according to the invention of a brake control function means that the corresponding brake control function can no longer be initiated, i.e. is no longer available, from the time of deactivation. In this context, it is possible, for example, to make provision for the deactivation to continue until the brake control function is reactivated by a corresponding control command. Such a control command could be initiated by a mechanic, for example, as soon as faulty sensor means have been replaced or repaired.

At the same time, despite a failure of the sensor device for determining the wheel speed, the affected brake control functions continue to be available, at least for a certain period of time. Consequently, it is possible, after an accident for example, for a brake control function, e.g. an automatic deceleration of the vehicle until said vehicle is stationary, to continue to be implemented for a short time. Furthermore, there is sufficient time available, e.g. after a failure of the affected sensor means in continuing (partially) automated driving operation, to notify the vehicle driver of the failure and to execute a safe transfer of control over the vehicle to the vehicle driver.

At the same time, provision is made for brake control functions that have already been executed at the time of the failure to continue to be executed and for deactivation of the corresponding brake control functions to take place only when continuing execution has been ended.

According to another embodiment, it is envisaged here that the brake control function is an antilock control process, wherein, after the detection of a failure of the sensor means for at least one of the vehicle wheels in executing the antilock control process, the vehicle wheel for which the failure of the sensor device has been detected is supplied with a predefined deceleration torque. In this context, a "deceleration torque" may be interpreted to mean a torque exerted on the vehicle wheel by the wheel brake, leading to slowing of the rotation of the vehicle wheel. Here, the deceleration torque may be chosen so that, under certain conditions, powerful deceleration is achieved but there is no risk that the decelerated wheel will lock up. For example, the deceleration torque can be chosen in such a way that, under normal conditions, that is to say, for example, in the case of a dry, asphalted road, a deceleration of the vehicle of 0.7 g would be achieved if all the wheel brakes were subjected to corresponding deceleration torques. In this way, it is ensured that, despite a failure of the corresponding sensor device, a certain contribution to the total deceleration of the vehicle continues to be made by the wheel brake of the wheel for which the failure has been detected.

In order to ensure the continued driving stability of the vehicle during the execution of a brake control function after detection of a failure of the sensor device for at least one of the vehicle wheels, it is envisaged according to another embodiment that, if a failure of the sensor device for at least one of the vehicle wheels has been detected in executing the brake control function, the yaw angle of the vehicle is monitored, wherein, if a change in the yaw angle that does not correspond to a steering command of a vehicle driver is detected, the wheel brake of the vehicle wheel for which the failure of the sensor device has been detected is at least partially released.

This approach is based on the consideration that, in the case of one-sided overbraking of the wheel brakes, i.e. increased slip at at least one of the wheels on one vehicle side, a yawing moment occurs, which can be detected by a corresponding sensor system. In this context, as soon as a yawing moment is detected that does not coincide with a steering command of the vehicle driver, it can be assumed that one of the wheels is locking up owing to an excessive deceleration torque. In this case, provision can be made for complete brake release at a wheel affected by the failure of the sensor device, i.e. complete release of the corresponding wheel brake, if such a yawing moment is detected. As an alternative, it is also possible for the deceleration torque at the affected wheel to be slowly reduced until the change in the yaw angle once again follows a steering command of the vehicle driver.

According to another embodiment, it is furthermore envisaged that the sensor device comprise at least one wheel speed sensor per vehicle wheel. It is furthermore also possible to envisage that the sensor device are of redundant configuration, i.e. the wheel speed of each vehicle wheel is monitored by at least two wheel speed sensors.

According to another embodiment, it is envisaged that the duration of the defined period of time is between 1 and 30 seconds, or between 1 and 5 seconds, or 2.5 seconds.

In order to inform the vehicle driver of a detected failure of the sensor device, it is envisaged according to another embodiment that, if a failure of the sensor device for at least one of the vehicle wheels is detected, an optical and/or acoustic warning is output to a vehicle driver. In particular, attention can be drawn to a detected failure by activation of a corresponding light in a dashboard of the vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Preferred embodiments of the invention are explained in more detail below on the basis of the drawings, in which.

DETAILED DESCRIPTION

In the text which follows, features that are similar or identical are denoted by the same reference signs.

Figure 1:
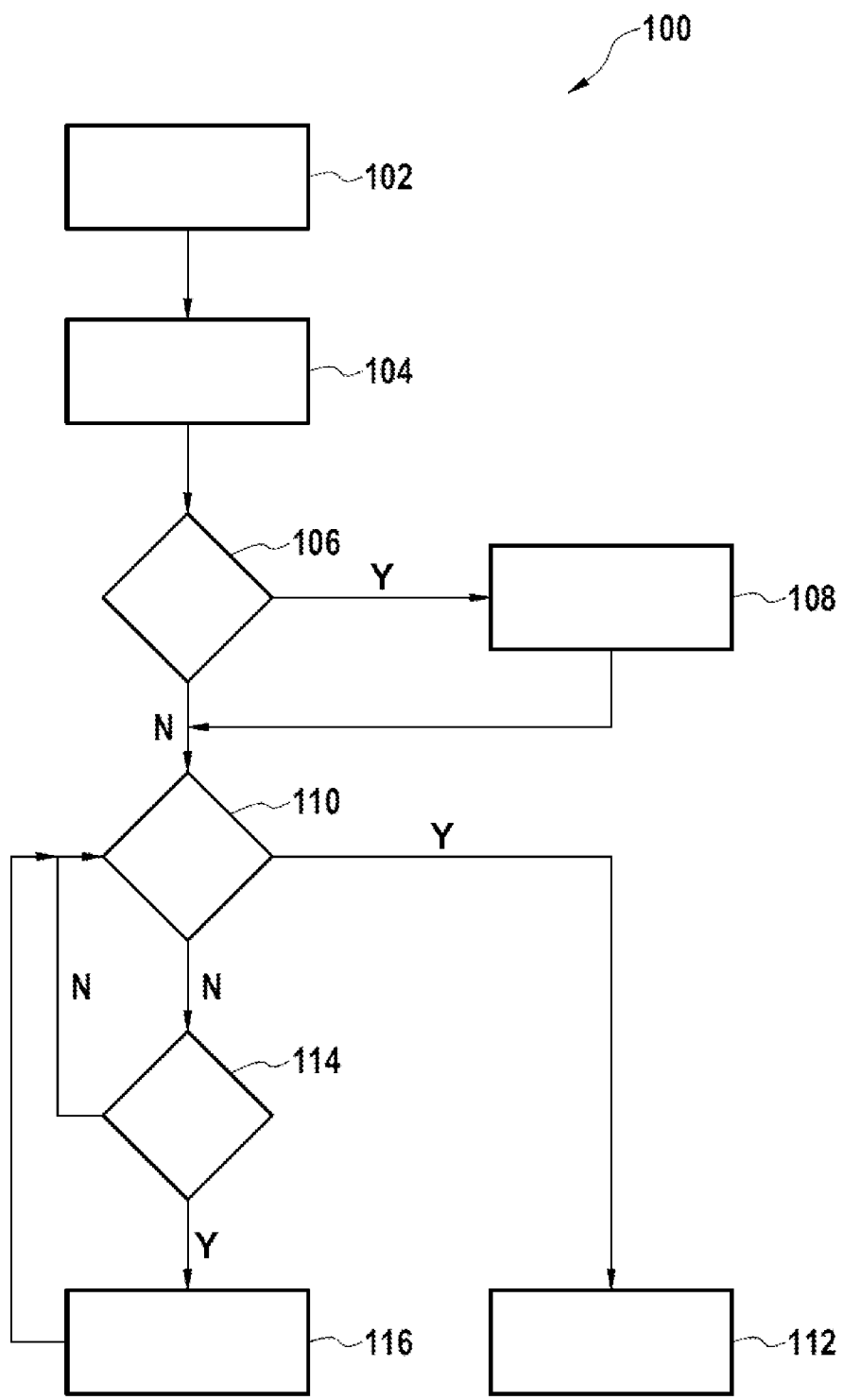
FIG. 1 shows a flowchart of one illustrative configuration of the method.

FIG. 1 shows a schematic depiction of one illustrative configuration of the method 100. To implement the method 100, a brake system of a vehicle is provided here, wherein the brake system has at least one wheel brake per vehicle wheel, wherein sensor device for determining wheel speeds of the vehicle wheels are provided for the wheel brakes, and wherein the brake system is designed to execute brake control functions on the basis of the wheel speeds determined by the sensor device. In particular, it is possible here for each vehicle wheel to have a wheel-specific wheel speed sensor.

In this case, a failure of the sensor device of the vehicle for at least one of the vehicle wheels is detected in a first method step 102. Such a failure may be due to a vehicle accident or to normal wear phenomena of vehicle elements, for example. Apart from a failure of a wheel speed sensor per se, the interruption of a data link between the wheel speed sensor and a brake control unit can also be interpreted as a failure of the sensor device since, in this case too, the necessary information relating to the speed of the affected vehicle wheel are no longer available.

After the failure of the sensor device has been detected in step 102, a timer is started in step 104, said timer measuring out a predefined period of time, e.g. a period of time of 2.5 seconds.

A check is then made in step 106 to determine whether a brake control function, e.g. an antilock control process, is being executed at the time of the failure. If this is the case, then, in step 108, the brake control function is continued until the execution of the brake control function has been completed, that is to say, for example, the vehicle has come to a halt or a corresponding braking demand is no longer present. In the case of an antilock control process, provision can be made here for the wheel affected by the failure of the sensor device to be subjected to a predefined deceleration torque, which corresponds to a vehicle deceleration of 0.7 g, for example.

If, on the other hand, it is ascertained in step 106 that no brake control function is being executed at the time of the failure, the method makes a transition to step 110, in which a check is made to determine whether the timer has expired, i.e. whether the predefined period of time has passed. After the execution of the brake control function has been completed in step 108, the method likewise makes a transition to step 110.

If it is ascertained in step 110 that the timer has already expired, the brake control function is deactivated in step 112, and the method ends at this point. In addition, an optical and/or acoustic warning can be output to a vehicle driver, indicating a failure of the sensor device or the deactivation of the brake control function.

If, on the other hand, it is ascertained in step 110 that the timer has not yet expired, a check is then made in step 114 to determine whether a brake control function has been initiated. In this case, a brake control function can be initiated by actuation of the vehicle brake by the vehicle driver or by a (partially) autonomous driving function, for example.

If it is ascertained during this process that no brake control function has been initiated, the method loops back to step 110, with the result that effectively continuous monitoring of the activation of brake control functions is performed until the timer has expired.

If, on the other hand, it is ascertained in step 114 that a brake control function has been initiated, the corresponding brake control function is then executed in step 116. As already explained with reference to step 108, the execution of the brake control function is preferably adapted in such a way that the missing wheel speed information on the affected wheel is compensated. As soon as the brake control function from step 116 has been completed, the method loops back to step 110, with the result that there is a continuous check to determine whether the timer has expired, i.e. that the defined period of time has passed.

Thus, by the method described, a brake control function is only deactivated as a result of a failure of the sensor device for at least one of the vehicle wheels if a defined period of time has passed and no brake control functions are still active.

Figure 2:
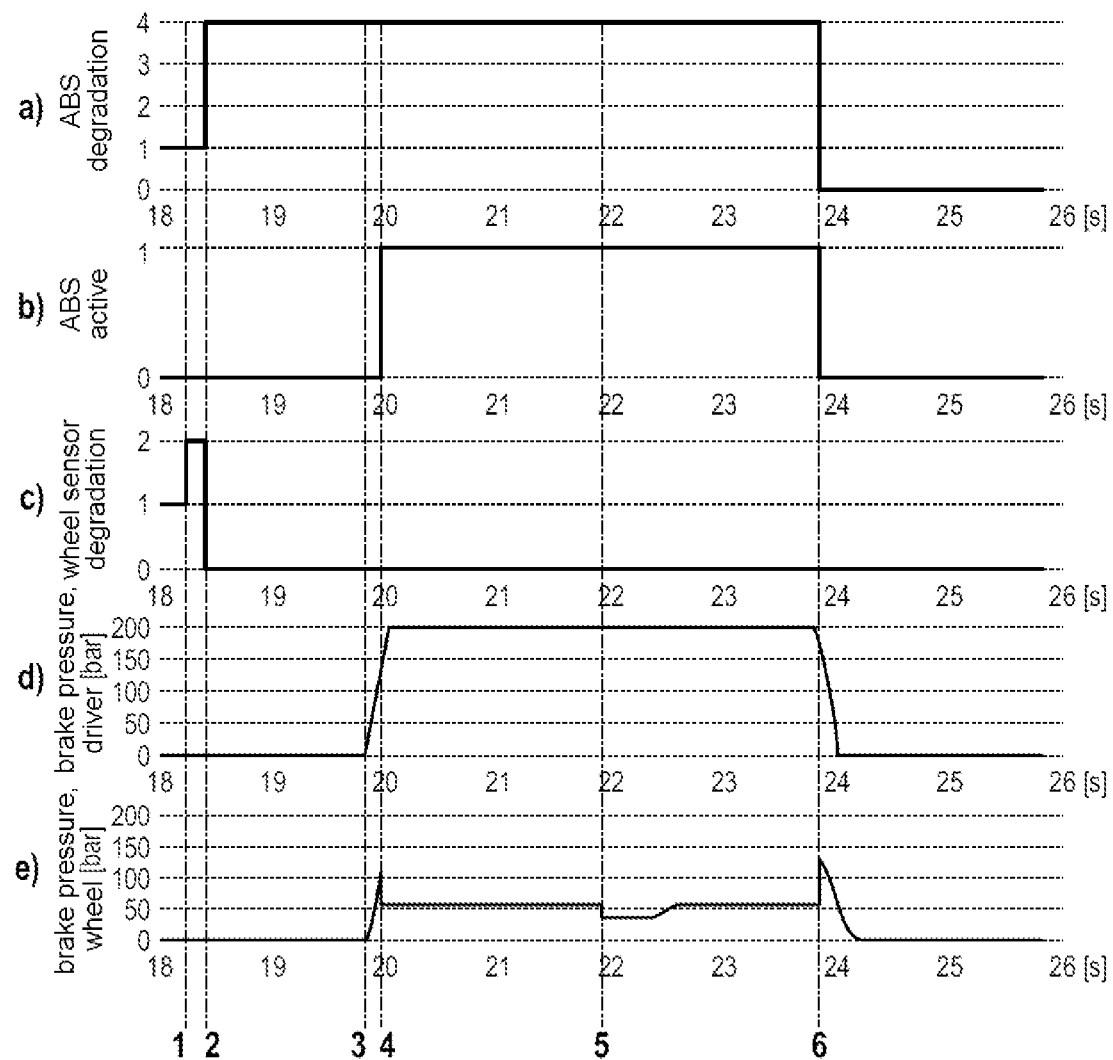
FIG. 2 shows schematic diagrams of different parameters of a vehicle during an illustrative implementation of the method.

FIG. 2 shows a schematic illustration of different parameters of a vehicle during an illustrative implementation of the method. In this case, by way of example, an antilock control process is considered as a brake control function.

Here, the state of degradation of an antilock control system is illustrated in the uppermost diagram a), showing the mode in which the antilock control system is operating. The second diagram b) illustrates the state of activation of the antilock control system, wherein state 1 indicates activation of the antilock control system. The third diagram c) illustrates, by way of example, the state of degradation of a wheel speed sensor, i.e. information on the operating mode thereof. The fourth diagram d) shows the characteristic of a brake pressure demanded by a vehicle driver by actuation of the brake, while the fifth and lowermost diagram e) illustrates the brake pressure actually present in a wheel brake.

In this context, the five diagrams are plotted against a common horizontal time axis.

In the initial state, there is no braking demand, and therefore diagrams b), d) and e) are at the value 0. The state of degradation of the antilock control system (diagram a)), and the state of degradation of the wheel speed sensor (diagram c)) is in the normal state 1.

At time 1, a fault occurs in the wheel speed sensor under consideration, although it has not yet been confirmed by a corresponding monitoring routine. Consequently, the state of degradation of the wheel speed sensor jumps to a corresponding operating mode 2. The other parameters initially remain unchanged.

At time 2, the fault in the wheel speed sensor has been confirmed, with the result that the state of degradation of the wheel speed sensor jumps to stage 0, which indicates that the wheel speed sensor is no longer available. As a consequence, the state of degradation of the antilock control system (diagram a)) is switched to a fallback operating mode, illustrated by stage 4. In this fallback operating mode, provision can be made, for example, when the antilock control system is activated by the failure of the wheel speed sensor, for the affected wheel to be subjected to a predefined deceleration torque.

At the same time, an ABS warning lamp of the vehicle can be activated for example, drawing the attention of the vehicle driver to the existing malfunction. At this time, a timer is started, which, in the example under consideration, measures out a period of time of 2.5 seconds, after which the antilock control system should be deactivated.

Within this period of time, the vehicle driver actuates the vehicle brake or a corresponding brake pedal at time 3, with the result that the brake pressure demanded by the vehicle driver rises in diagram d).

At time 4, the brake pressure demanded by the vehicle driver exceeds a locking pressure level, at which locking of the wheel occurs. Consequently, the antilock control system is activated at this time, as indicated in diagram b). Since the antilock control system is in the fallback operating mode (diagram a)), the brake pressure and thus the deceleration torque at the wheel affected by the failure is limited to a predefined value.

Although, as the antilock control process continues, the period of time of 2.5 seconds in this example has already passed, the deactivation of the antilock control system is delayed until the execution thereof has been completed. Consequently, the antilock control system initially remains active.

In this case, an instability of the vehicle due to the braking process is detected at time 5 by monitoring the yaw angle of the vehicle, for example. As a consequence, the brake pressure at the affected wheel is automatically lowered until the vehicle is stable again. The brake pressure is then set to the previously specified value again.

At time 6, the vehicle driver has released the brake, and therefore the brake pressure demanded falls. Here, the brake pressure has fallen below the locking pressure level at time 6, with the result that the antilock brake system is deactivated (stage 0 in diagram b)). Since the defined period of time has passed at this time and the antilock control system is no longer active, the stage of degradation of the antilock control system is switched to mode 0, which indicates that the function is no longer available, that is to say is deactivated.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for controlling a brake system of a vehicle comprising:
   providing at least one wheel brake per vehicle wheel;
   determining wheel speeds of the vehicle wheels with a sensor device provided for each of the at least one wheel brakes, wherein the brake system is designed to execute brake control functions on the basis of the wheel speeds determined by the sensor device;
   detecting a failure of the sensor device for at least one of the vehicle wheels;
   checking whether a brake control function is being executed by the brake system at the time of the failure;
   continuing the brake control function if a brake control function is being executed by the brake system at the time of the failure and deactivating the brake control function when the execution of the brake control function has been completed;
   checking whether a brake control function is initiated within a defined period of time after the time of the failure if no brake control function is being executed by the brake system at the time of the failure;
   executing the brake control function if a brake control function is initiated within the defined period of time after the time of the failure; and
   deactivating the brake control function when one of the execution of the brake control function has been completed and the period of time has expired and if no brake control function has been initiated within the defined period of time after the time of the failure.

2. The method as claimed in claim 1, wherein the detection of a failure of the sensor device for at least one of the vehicle wheels occurs when executing an antilock control process, and further comprising supplying the vehicle wheel for which the failure of the sensor device has been detected with a predefined deceleration torque.

3. The method as claimed in claim 1, further comprising after the failure of the sensor device has been detected in executing the brake control function:
   monitoring the yaw angle of the vehicle;
   comparing the yaw angle to a steering command of a vehicle driver
   at least partially releasing the vehicle wheel for which the failure of the sensor device has been detected when the change in the yaw angle does not correspond to the steering command.

4. The method as claimed in claim 1, wherein the sensor device further comprises at least one wheel speed sensor per vehicle wheel.

5. The method as claimed in claim 1, wherein the duration of the defined period of time is between 1 and 30 seconds.

6. The method as claimed in claim 1, wherein the duration of the defined period of time is between 1 and 5 seconds.

7. The method as claimed in claim 1, wherein the duration of the defined period of time is 2.5 seconds.

8. The method as claimed in claim 1, further comprising outputting to a vehicle driver at least one of an optical and acoustic warning when the failure of the sensor device for at least one of the vehicle wheels is detected.

* * * * *